United States Patent [19]
Kamiyama et al.

[11] Patent Number: 6,024,910
[45] Date of Patent: *Feb. 15, 2000

[54] METHOD FOR LINING A TUBULAR CONDUIT

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-Jushi Seisakusho K.K., Kanagawa-Ken; Yokoshima & Company; Get, Inc., both of Ibaraki-ken; Oar Company, Saitama-ken, all of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,757

[22] Filed: Jun. 5, 1997

[30] Foreign Application Priority Data

Jun. 6, 1996 [JP] Japan ..................... 8-144277

[51] Int. Cl.[7] .................................. B29C 63/34
[52] U.S. Cl. ............... 264/516; 138/97; 138/98; 156/287; 156/294; 264/269
[58] Field of Search ..................... 156/287, 294; 264/269, 573, 516; 138/97, 98; 405/150.1, 154

[56] References Cited

U.S. PATENT DOCUMENTS

| | | |
|---|---|---|
| 2,794,758 | 6/1957 | Harper et al. ............... 156/294 |
| 3,132,062 | 5/1964 | Lang et al. ............... 156/294 |
| 4,009,063 | 2/1977 | Wood ..................... 156/294 |
| 4,064,211 | 12/1977 | Wood ..................... 156/287 |
| 4,350,548 | 9/1982 | Zenbayashi et al. ............ 156/294 |
| 4,368,091 | 1/1983 | Ontsuga et al. ............ 156/287 |
| 4,640,313 | 2/1987 | Stanley. ..................... 156/287 |
| 4,714,095 | 12/1987 | Muller et al. ............... 138/98 |
| 4,976,290 | 12/1990 | Gelin et al. ............... 138/98 |
| 5,180,458 | 1/1993 | White ..................... 156/287 |
| 5,225,121 | 7/1993 | Yokoshima ............ 156/294 |
| 5,334,429 | 8/1994 | Imoto et al. ............... 138/98 |
| 5,490,964 | 2/1996 | Kamiyama et al. ............ 156/287 |

FOREIGN PATENT DOCUMENTS

| | | | |
|---|---|---|---|
| 61-274026 | 12/1986 | Japan ..................... 156/294 |
| 6-297573 | 10/1994 | Japan ..................... 156/294 |
| WO 88/01707 | 3/1988 | WIPO ..................... 156/287 |
| WO 88/09897 | 12/1988 | WIPO ..................... 156/294 |

*Primary Examiner*—Steven D. Maki
*Attorney, Agent, or Firm*—Whitham, Curtis & Whitham

[57] ABSTRACT

A method for lining an underground sewer pipe: (a) preparing a tubular liner made of a tubular fabric layer soaked with a thermosetting liquid resin and two layers of airtight film with which inner and outer walls of the fabric layer are covered; (b) inserting the liner assembly into the tubular conduit from the front end by pulling the front end with a rope; (c) inflating the tubular liner assembly after closing the front and the rear ends thereof; (d) heating the thermosetting resin to thereby harden the fabric layer of the liner assembly; and (e) removing those portions of the tubular liner assembly which do not partake in lining the tubular conduit.

15 Claims, 7 Drawing Sheets

METHOD FOR LINING A TUBULAR CONDUIT

BACKGROUND OF THE INVENTION

1. Field of the Invention

The present invention relates to a method for lining a tubular conduit with a tubular liner, which is composed of a tube of a nonwoven fabric impregnated with a thermosetting liquid resin and laminated both inner and outer faces with a highly airtight film.

2. Description of the Prior Art

When a tubular conduit, such as underground pipelines and passageways, becomes defective or too old to perform properly, the tubular conduit is repaired and rehabilitated without digging the earth to expose it and disassembling it into sections. This non-digging method of repairing an underground tubular conduit has been known and practiced commonly in the field of civil engineering. Typically, the method is disclosed by Japanese Provisional Patent Publication (Kokai) No. 60-242038.

According to this publication, this tubular conduit repair method comprises inserting a sufficiently long tubular flexible liner bag into the tubular conduit to be repaired by means of a pressurized fluid, like air and water. The tubular liner bag is made of a flexible resin-absorbent material layer impregnated with a thermosetting liquid resin, and has the outer surface covered with an impermeable plastic film.

More particularly, according to the publication, the tubular flexible liner bag is closed at one end and open at the other; the tubular flexible liner bag is first flattened. Then, the open end of the tubular liner bag is made to gape wide and hooked (anchored) at the end of the defective or old tubular conduit in a manner such that the wide-opened end of the liner bag completely and fixedly covers and closes the tubular conduit end; a portion of the liner bag is pushed into the tubular conduit such that an annular pocket is formed; then, the pressurized fluid is applied to the annular pocket of the tubular liner bag such that the fluid urges the tubular liner bag to enter the tubular conduit. Since one end of the tubular liner bag is hooked at the end of the tubular conduit, it remains there while the rest of the flexible liner bag is turned inside out as it proceeds deeper in the tubular conduit. (Hereinafter, this manner of insertion shall be called "everting" or "eversion".) When the entire length of the tubular liner bag is everted (i.e., turned inside out) into the tubular conduit, the everted tubular liner bag is pressed against the inner wall of the tubular conduit by the said pressurized fluid or by an inflatable pressure bag later inserted, and the tubular flexible liner bag is hardened as the thermosetting liquid resin impregnated through the tissue (thickness) of the liner bag is heated, which is effected by heating the fluid filling the tubular liner bag by means of a hot steam, etc. Thereafter the closed end of the liner bag is cut off. It is thus possible to line the inside wall of the defective or old tubular conduit with a rigid liner without digging the ground and disassembling the tubular conduit into sections.

Now, in the case of a sewer pipe, drain water is always running in the pipe so that, when a portion of the pipe is to be repaired by lining, it is necessary to divert the drain water to bypass that portion of the pipe. The most common manner to do so consists of plugging the pipe at a location upstream from the portion to be repaired so as to stop the flow of the drain water, pumping up the stopped drain water to the surface of ground (along a manhole), and sending it back to the pipe at a location downstream from the portion to be repaired (generally along the next manhole), thereby bypassing the portion of the pipe to be repaired.

However, the above-stated method of diverting the drain water to bypass the repair portion of the pipe is not always easy to practice; for example, if a road, a railway, or a river lies across the line connecting two manholes between which the pipe to be repaired extends, it is virtually impossible to set up a bypass passage for the drain water.

So, under such circumstances as described above where it was impossible to provide a bypass to divert the drain water, the flow of the drain water in the sewer pipe was temporarily checked (generally, for two to fifteen hours) at a location upstream from the portion to be repaired (for instance, at a pumping location), during which time the lining operation is conducted.

The Problems the Invention seeks to solve

Thus, in such conventional lining method, in order to accomplish the lining operation, it was necessary first to suspend the flow of the drain water and, only after then, the tubular liner bag is everted into the pipe by a fluid pressure, and it is heated while pressed against the inner wall of the pipe whereby the hardenable liquid resin impregnated through the tissue of the tubular liner bag is cured. Consequently, this lining operation was considerably time-consuming, especially so when the diameter of the pipe is large, such as 600 mm or greater, and hence the operation was costly.

SUMMARY OF THE INVENTION

The present invention was made in view of the above problem and others, and it is, therefore, an object of the invention to provide a new method for lining a tubular conduit which can reduce the time length over which the flow of the drain water is checked, so that the operation time for lining is greatly reduced, especially in cases where the tubular conduits have relatively large diameters, and that the lining operation is rationalized.

Means to solve the Problems

In order to solve the above problems and others, there is proposed a method for lining a tubular conduit. According to the proposal, the inventive method includes the following steps: (a) preparing a tubular liner assembly having a front end and a rear end capable of being closed, and consisting essentially of: a fabric layer which is soaked with a thermosetting resin and which has a tubular shape; and two layers of airtight film with which inner and outer walls of said fabric layer are respectively covered; (b) inserting said liner assembly into the tubular conduit from the front end by pulling the front end with a pulling means; (c) pneumatically inflating said tubular liner assembly after closing the front and the rear ends thereof, which closing is effected prior to this step (c); (d) heating the thermosetting resin to thereby harden the fabric layer of the liner assembly; and (e) removing those portions of said tubular liner assembly which do not partake in lining the tubular conduit.

In an embodiment, according to the invention, said closing of the front and the rear ends of the tubular liner assembly is effected before the insertion of the liner assembly into the tubular conduit.

Or alternatively, said closing of the front and the rear ends of the tubular liner assembly is effected after the insertion of the liner assembly into the tubular conduit.

Preferably, said tubular liner assembly further consists of: (i) a pair of sealing means with which the ends of said tubular fabric layer are closed before the insertion of the liner assembly into the tubular conduit, (ii) a gas conduit means for supplying gas to the interior of the closed tubular fabric layer, and (iii) a first liquid conduit means which is inserted in the tubular fabric layer substantially throughout the length thereof and adapted to sprinkle hot liquid uniformly inside the tubular fabric layer; and in said step (c) the inflation is effected with compressed air supplied to the interior of the closed tubular fabric layer by way of the gas conduit means, and in said step (d) the heating is effected by sprinkling hot liquid from said first liquid conduit means.

In a more preferred embodiment, the method is repeated twice or more times to obtain a multi-layer lining consisting of two or more layers of the tubular fabric layers.

In a final embodiment, said tubular liner assembly further consists of: a second liquid conduit means for drawing liquid from the interior of the closed tubular fabric layer; and the liquid used to heat the thermosetting resin is drawn out from the interior of the closed tubular fabric layer by way of the second liquid conduit means and after being heated sprinkled from said first liquid conduit means again.

Effects of the Invention

According to the invention, since the conventional eversion method is not employed, the drawing of the tubular liner assembly into the tubular conduit can be done while the tubular conduit is in service (that is, the drain water is not stopped from flowing in the tubular conduit), and it is only while the tubular liner assembly is inflated that the drain flow is suspended; thus it is possible to prepare for the hot water sprinkling at the same time as the tubular liner assembly is set in the repair portion of the tubular conduit. Consequently, the tubular conduit lining operation is conducted in a substantially shorter time with the shorter suspension of the drain water. Also, the lining of the tubular conduits that have relatively large diameters is conducted with ease.

Furthermore, according to the invention, the sequence of the steps of inserting the tubular liner assembly into the tubular conduit and hardening the tubular fabric layer is arranged to be carried out twice or more, so that it is possible to select tubular fabric layers which have relatively small thicknesses; consequently, the time required to harden the thermosetting resin can be reduced, and also by lining the inner wall of the tubular conduit with more than one pipe liner layers, it becomes possible to provide a sufficiently thick liner to the tubular conduit of a large diameter.

What is more, while the sequence of the steps of drawing a tubular liner assembly into the tubular conduit and hardening the tubular fabric layer is repeated, the hot liquid is circulated so that it can be used over and over again for the heating of the tubular fabric layer; consequently, it is possible to downsize the heating facility consisting of a hot water tank, a boiler, etc., and thus the lining operation becomes more economical and less energy-consuming.

The above and other objects and features of the invention will appear more fully hereinafter in the following description given in connection with the accompanying drawings and the novelty thereof pointed out in the appended claims.

EMBODIMENT

Next, an embodiment of the invention will be described with reference to the attached drawings.

Figure 1:
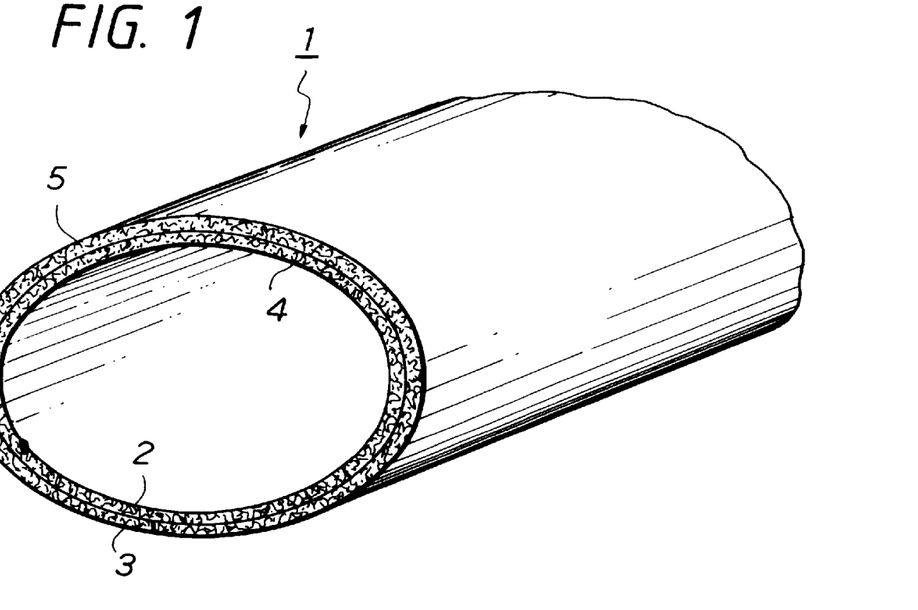
FIG. 1 is a perspective view of part of a tubular liner used in a pipe lining method according to the invention.
Figure 2:
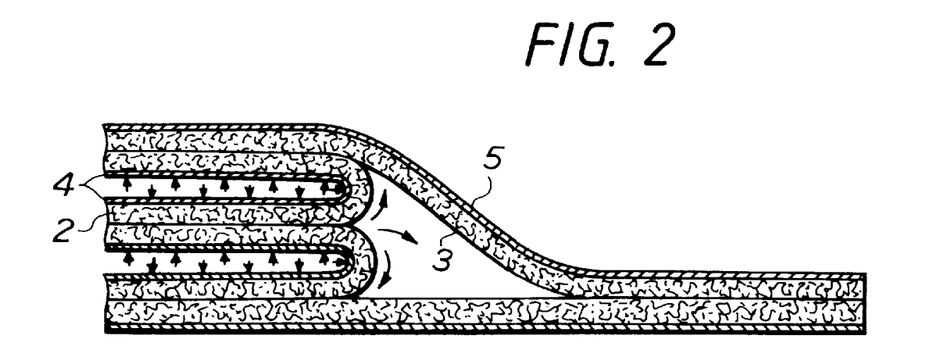
FIG. 2 is a sectional view, illustrating a step in a procedure for making the tubular liner used in the pipe lining method according to the invention.
Figure 3:
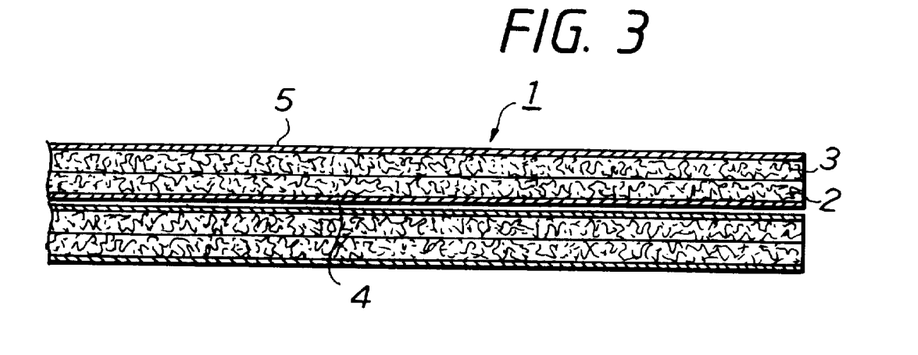
FIG. 3 is a sectional view, illustrating another step in the procedure for making the tubular liner used in the pipe lining method according to the invention.

FIG. 1 is a perspective view of part of a tubular liner used in a pipe lining method according to the invention, and FIGS. 2 and 3 are sectional views to illustrate steps in a procedure for making the tubular liner used in the pipe lining method.

As shown in FIG. 1, a tubular liner 1 used in the pipe lining method of the invention comprises a long laminated tube of an inner resin-absorbent fabric layer 2 and an outer resin-absorbent fabric layer 3, and both the inner and outer faces of the two-layered tubular liner 1 are covered with a layer of highly-airtight plastic film 4, 5, respectively. The resin-absorbent fabric layers 2, 3 are to be soaked with a liquid thermosetting resin.

Incidentally, the resin-absorbent fabric to form the layers 2, 3 is a nonwoven fabric obtained by bonding or punch-pressing a mass of fiber such as of polyester, nylon, and polypropylene, and the plastic film 4, 5 is made of a material such as polyurethane, polyethylene, nylon, and polyvinyl chloride.

Also, the liquid thermosetting resin to wet the resin-absorbent material is selected from such resins as polyester, epoxy, and vinyl ester.

Now, as shown in FIG. 2, in making the tubular liner 1, the nonwoven fabric tube 2, which is soaked with the liquid thermosetting resin and whose outer face is covered with the plastic film 4, is everted by a fluid pressure into the nonwoven fabric tube 3, which is also soaked with the liquid thermosetting resin and whose outer face is covered with the plastic film 5. As the result, the tubular liner 1 is obtained, which is laminated of inner and outer layers 2, 3 and whose inner and outer faces are lined with the plastic film 4, 5, respectively, as shown in FIGS. 1 and 3.

Figure 9:
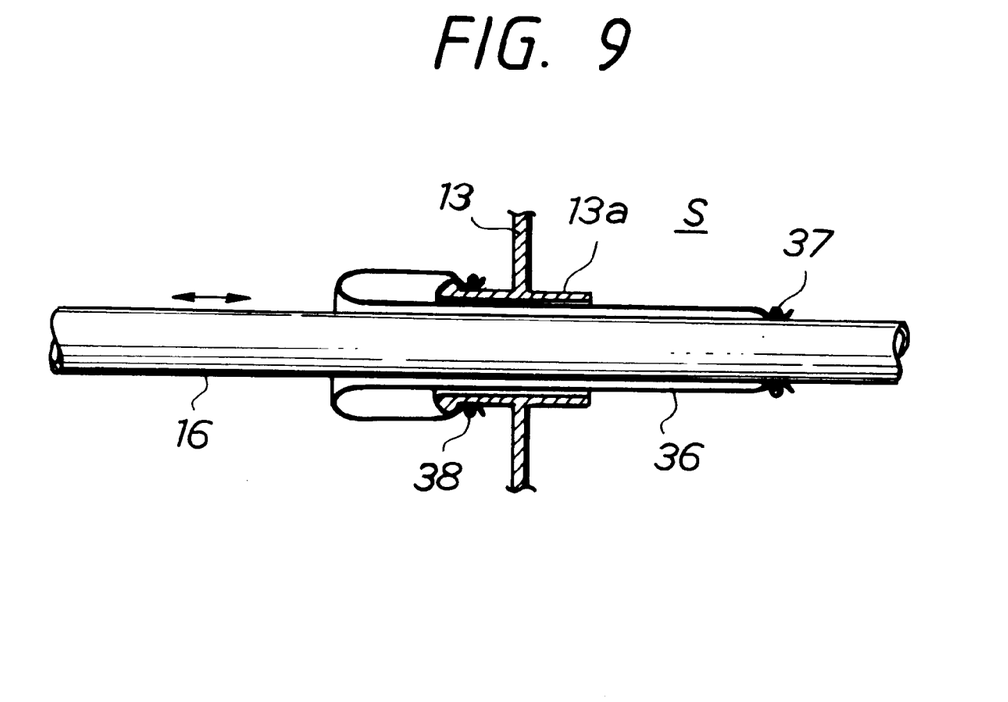
FIG. 9 is an enlarged view of the portion A of FIG. 6.
Figure 10:
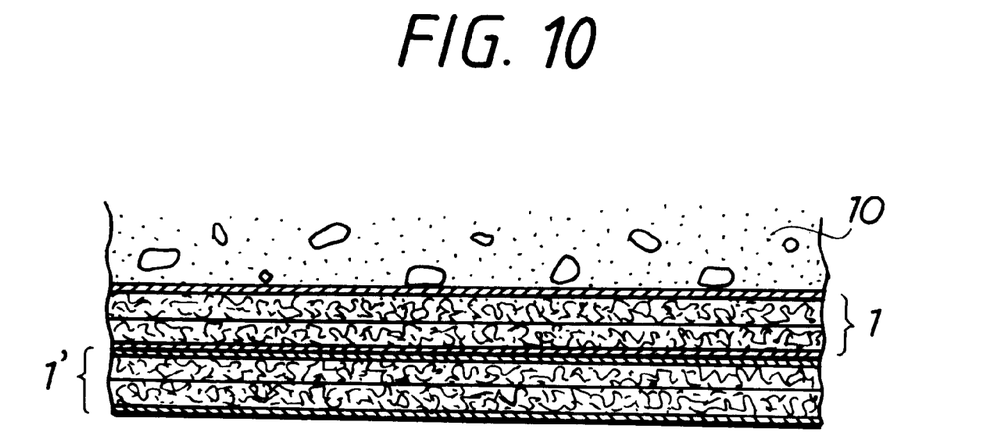
FIG. 10 is an enlarged view of the portion B of FIG. 8.

Next, we will explain the inventive method for lining a tubular conduit wherein the pipe liner 1 obtained in a manner as described above is used, with reference to FIGS. 4 through 10. Incidentally, FIGS. 4 through 8 illustrate the inventive method for lining an underground pipe in the order of procedure, FIG. 9 is an enlarged view of the portion A of FIG. 6, and FIG. 10 is an enlarged view of the portion B of FIG. 8.

Figure 4:
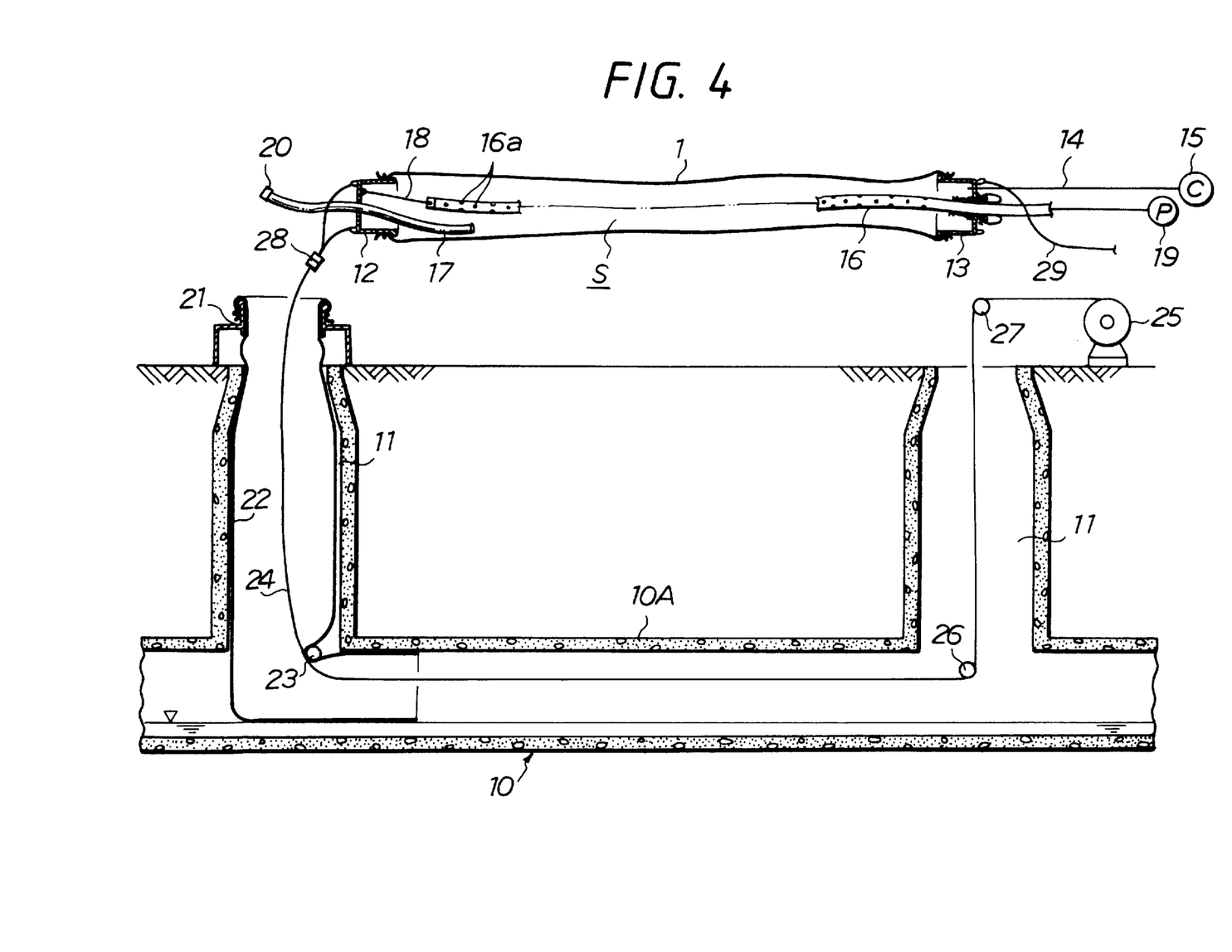
FIG. 4 is a sectional view of a repair operation site, illustrating a step of the pipe lining method according to the invention.

In FIG. 4, the reference numeral 10 designates an underground sewer pipe, and the reference numerals 11, 11' designate neighboring manholes which open in the surface of the ground. The manhole 11 is located upstream of the manhole 11'. As shown, the sewer pipe 10 runs through the bottoms of the manholes 11, 11', and that portion 10A of the pipe 10 which lies between these manholes 11, 11' is going to be lined. Prior to lining the underground pipe 10, a pipe liner 1 having a suitable length is prepared on the ground. Its open ends are closed, the front end with a sealing cap 12 and the rear end with a sealing cap 13, so that a closed space S is formed inside the pipe liner 1. An air hose 14 connected to a compressor 15 installed on the ground is passed through the sealing cap 13 to thereby communicate with the closed space S.

Also, a hot water hose 16 is drawn deep inside the space S of the pipe liner 1 past the sealing cap 13, and a drain hose 17 is also drawn into the space S past the sealing cap 12.

That end of the hot water hose 16 which is drawn into the closed space S is closed and tethered to the inner face of the sealing cap 12 by means of a rope 18, and the other end of the hot water hose 16 which extends outside the closed space S is connected to a hot water pump 19. Incidentally, the hot water hose 16 is made with a lot of punctures 16a distributed evenly along that portion of the hose 16 which is disposed inside the closed space S.

That portion of the drain hose 17 which is drawn into the closed space S of the tubular liner 1 is so short as to terminate only in the vicinity of the sealing cap 12, and the other portion of the drain hose 17 which extends outside the closed space S is even shorter and terminates with a coupling 20.

A guide nozzle 21 is provided over the opening of the manhole 11, supported by a mount installed on the ground. A tubular liner guide 22 is inserted from the guide nozzle 21 into the manhole 11. The upper end of the liner guide 22 is turned inside out a little and is anchored around the periphery of the upper end of the guide nozzle 21. The lower end portion of the liner guide 22 is made to turn and extend into the portion 10A of the sewer pipe 10 and terminates in the vicinity of the manhole 11, as shown. Also, as shown in FIG. 4, the liner guide 22 is deformed by a bar 23 at the location where manhole 11 joins with the pipe 10.

As shown in FIG. 4, prior to the lining operation, the forked end of a tow rope assembly 28 is connected to the sealing cap 12 closing the front end of the tubular liner 1, and the free end of the tow rope assembly 28 is passed through the liner guide 22, the portion 10A of the pipe 10, and up the manhole 11', and is wound round a winch 25 installed on the ground. Incidentally, the tow rope assembly 28 is guided by the guide rollers 26, 27 so that it turns by an angle of about 90 degrees at the rollers so as not to come in touch with the walls of the pipe 10 or manholes 11, 11'. The tow rope assembly 24 includes a twist adjuster 28. To the sealing cap 13 at the rear end of the pipe liner 1 is connected a tow rope 29.

Figure 5:
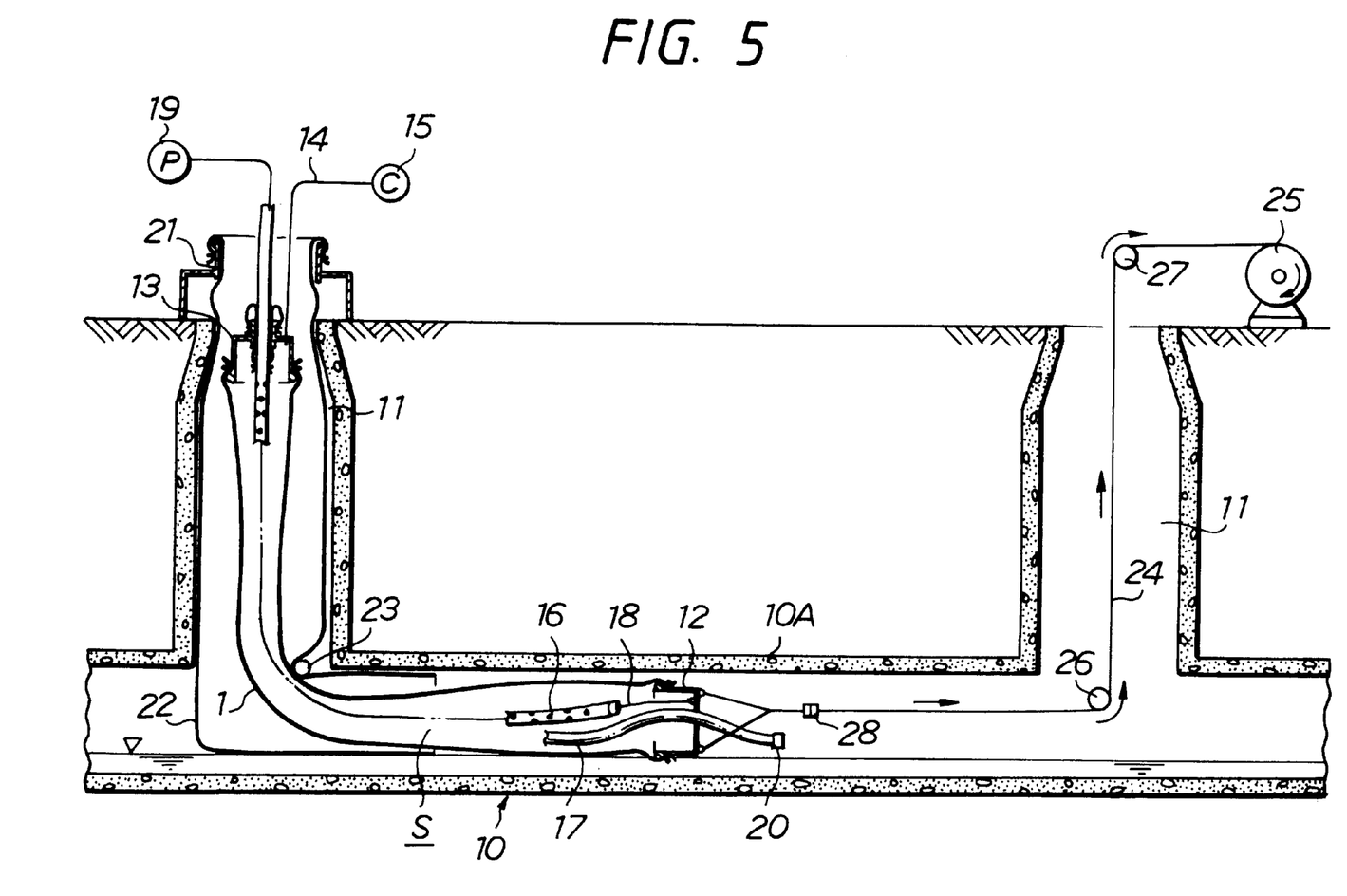
FIG. 5 is a sectional view of a repair operation site, illustrating another step of the pipe lining method according to the invention.
Figure 6:
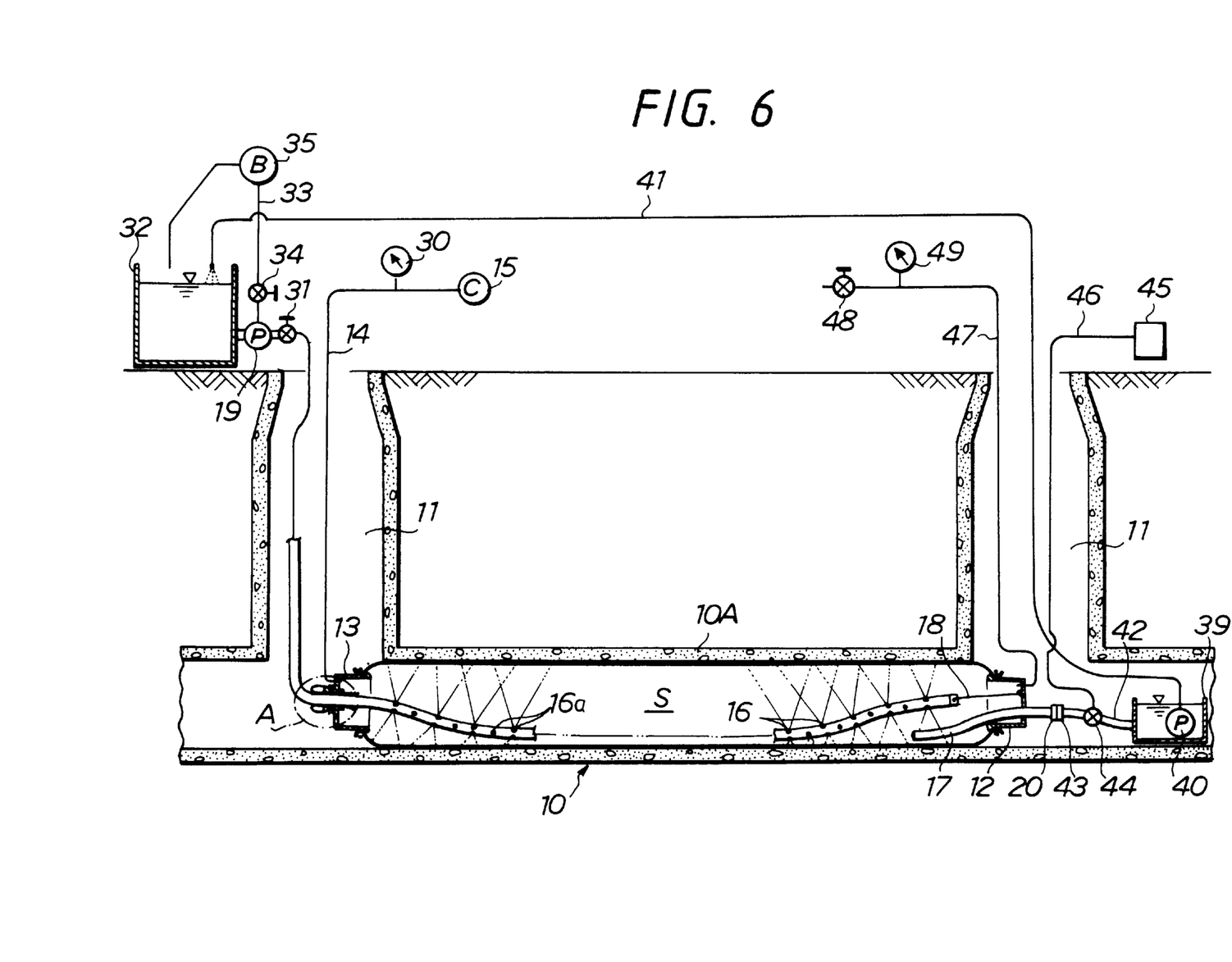
FIG. 6 is a sectional view of a repair operation site, illustrating another step of the pipe lining method according to the invention.

Now, while allowing the drain water to run in the pipe 10 as usual, the winch 25 is driven to take up the rope of the tow rope assembly 24 whereupon the pipe liner 1 together with the air hose 14, the hot water hose 16, and the drain hose 17 is drawn into the portion 10A of the sewer pipe 10 past the liner guide 22, as shown in FIG. 5. At this time, the pipe liner 1 floats on the stream of the drain water, which runs from the manhole 11 to the manhole 11' (from left to right, as viewed in FIG. 5.), so that the drawing of the pipe liner is thus facilitated.

When the entire length of the pipe liner 1 is drawn into the sewer pipe 10, the flow of the drain water in the pipe 10 is temporarily checked at a location upstream from the portion 10A of the pipe 10 (for instance, at a pumping location), and the compressor 15 installed on the ground is driven to supply compressed air to the closed space S of the pipe liner 1 by way of the air hose 14. Then, the pipe liner 1 is inflated with the compressed air and pressed against the inner wall of the portion 10A of the sewer pipe 10, as shown in FIG. 6. Incidentally, there is provided a pressure gauge 30 across the air hose 14.

Now, the end of that portion of the hot water hose 16 which extends outside the closed space S is connected to the hot water pump 19 via a valve 31, and the hot water pump 19 is connected to the hot water tank 32, as shown in FIG. 6. The hot water pump 19 and the hot water tank 32 constitute part of a heating facility built on the ground.

A hot water pipe 33 extends upward from the hot water pump 19 and is disposed to open above the hot water tank 32. A boiler 35 is provided across the hot water pipe 33, and a valve 34 is provided thereacross at a location between the boiler 35 and the pump 19.

Next, a sealing structure where the hot water hose 16 passes through the sealing cap 13 will be explained with reference to FIG. 9.

As shown in FIG. 9, the sealing cap 13 is formed with a tubular nozzle 13a, through which the hot water hose 16 penetrates as it is drawn into the closed space S. A highly airtight and flexible eversive tube 36 is passed on the hot water hose 16 in a manner such as to sheathe the latter. One end portion of the eversive tube 36 is fixed on the outer peripheral surface of that portion of the hot water hose 16 which is inside the closed space S at a location in the vicinity of the sealing cap 13 by means of an elastic band 37. The other end portion of the eversive tube 36 is passed through the tubular nozzle 13a of the sealing cap 13 to extend outside the closed space S, and turned inside out, and anchored at the brim of the tubular nozzle 13a by being pressed on the outer peripheral surface of it by an elastic band 38.

Thus, the hot water hose 16 is airtightly connected to the sealing cap 13 by means of the eversive tube 36, and is disposed to slide freely through the sealing cap 13 in either way as indicated by the double-headed arrow in FIG. 9, by virtue of the flexibility of the eversive tube 36, so that the length of the hot water hose 16 that is inside the closed space S can be freely adjusted.

As shown in FIG. 6, another hot water tank 39 of a smaller size is installed inside the sewer pipe 10 at a location downstream from the manhole 11'. In this hot water tank 39 is provided a hot water pump 40, from which extends a hot water hose 41. This hot water hose 41 is passed through the manhole 11', and terminates over the hot water tank 32, as shown.

A drain hose 42 is connected to the hot water tank 39, and its free end is connected to the drain hose 17 as a coupling 43 provided at the free end of the drain hose 42 is coupled with the coupling 20 of the drain hose 17, as shown in FIG. 6. An electromagnetic valve 44 is provided across the drain hose 42, and is electrically connected via a control cable 46 to a controller 45 installed on the ground.

An air release hose 47 is connected to the sealing cap 12 to open in the closed space S. This air release hose 47 is passed through the manhole 11' and extends over the ground. A valve 48 is connected at the terminal of the hose 47 and a pressure gauge is provided across the hose 47.

While the pipe liner 1 is inflated with the compressed air and kept being pressed against the inner wall of the portion 10A of the sewer pipe 10, as described earlier, the hot water pump 19 is driven to rush hot water into the hot water hose 16 from the hot water tank 32. The hot water is then sprinkled from the punctures 16a made throughout that portion of the hose 16 which is disposed inside the closed space S.

Thus, the pipe liner 1 is heated by the hot water sprinkled inside the closed space S in a manner such that the inner wall surface of the pipe liner 1 is first heated and gradually the heat is conducted radially outwardly through the thickness of the pipe liner 1. The thermosetting resin impregnated through the thickness of the pipe liner 1 is thereby heated and hardened, and thus the interior of the portion 10A of the sewer pipe 10 is lined with the rigid pipe liner 1 and the rehabilitation and reinforcement of the pipe 10 is done.

Incidentally, on this occasion, the electromagnetic valve 44 is opened by the controller 45, and the hot water pump 40 is driven in a manner such that the hot water sprinkled in the closed space S and used to heat the pipe liner 1 is drawn from the floor formed in the pipe liner 1 into drain hoses 17, 42, and collected in the hot water tank 39. Then, the hot water is pushed into the hot water hose 41 by the hot water pump 40, and sent back to the hot water tank 32 on the ground, so that it can be used for further heating of the pipe liner 1 or a next pipe liner 1'.

As described above, in the pipe lining method according to the present invention, the drawing of the pipe liner 1 into the sewer pipe 10 is done while the sewer pipe 10 is maintained in service (that is, the drain water is not stopped from flowing in the pipe 10), and thus it is possible to prepare for the hot water sprinkling at the same time as the pipe liner 1 is set in the portion 10A of the sewer pipe 10. More specifically, as the hot water pump 19 and the boiler 35 are turned on while the valve 31 is closed and the valve 34 is opened, the water in the hot water tank 32 is circulated by way of the hot water pipe 33 and heated by the boiler 35 until the water temperature reaches a predetermined temperature which is substantially higher than the curing point of the thermosetting resin impregnated through the pipe liner 1. Thus, the hot water tank 32 is filled with hot water ready for heating the pipe liner 1.

Figure 7:
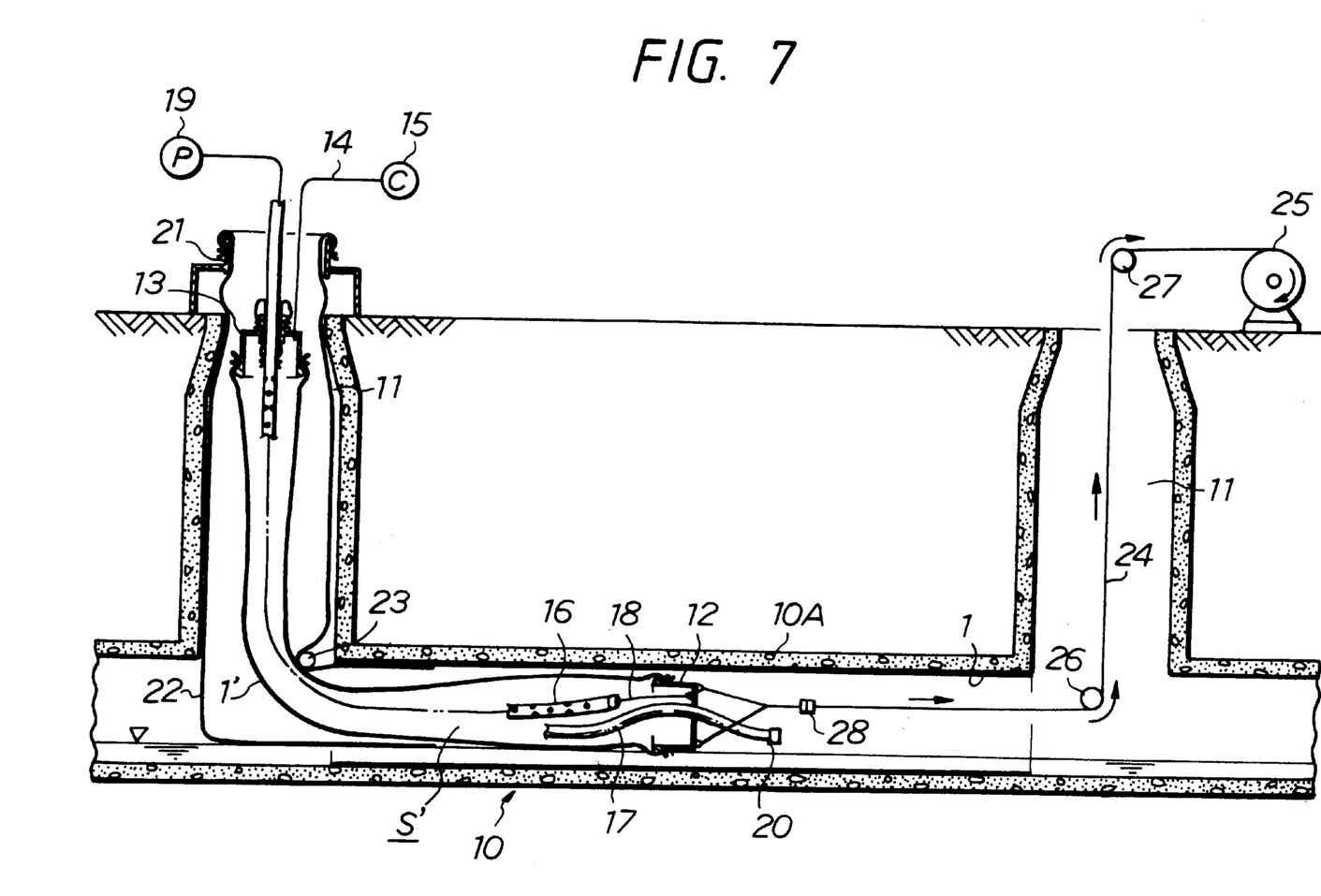
FIG. 7 is a sectional view of a repair operation site, illustrating another step of the pipe lining method according to the invention.
Figure 8:
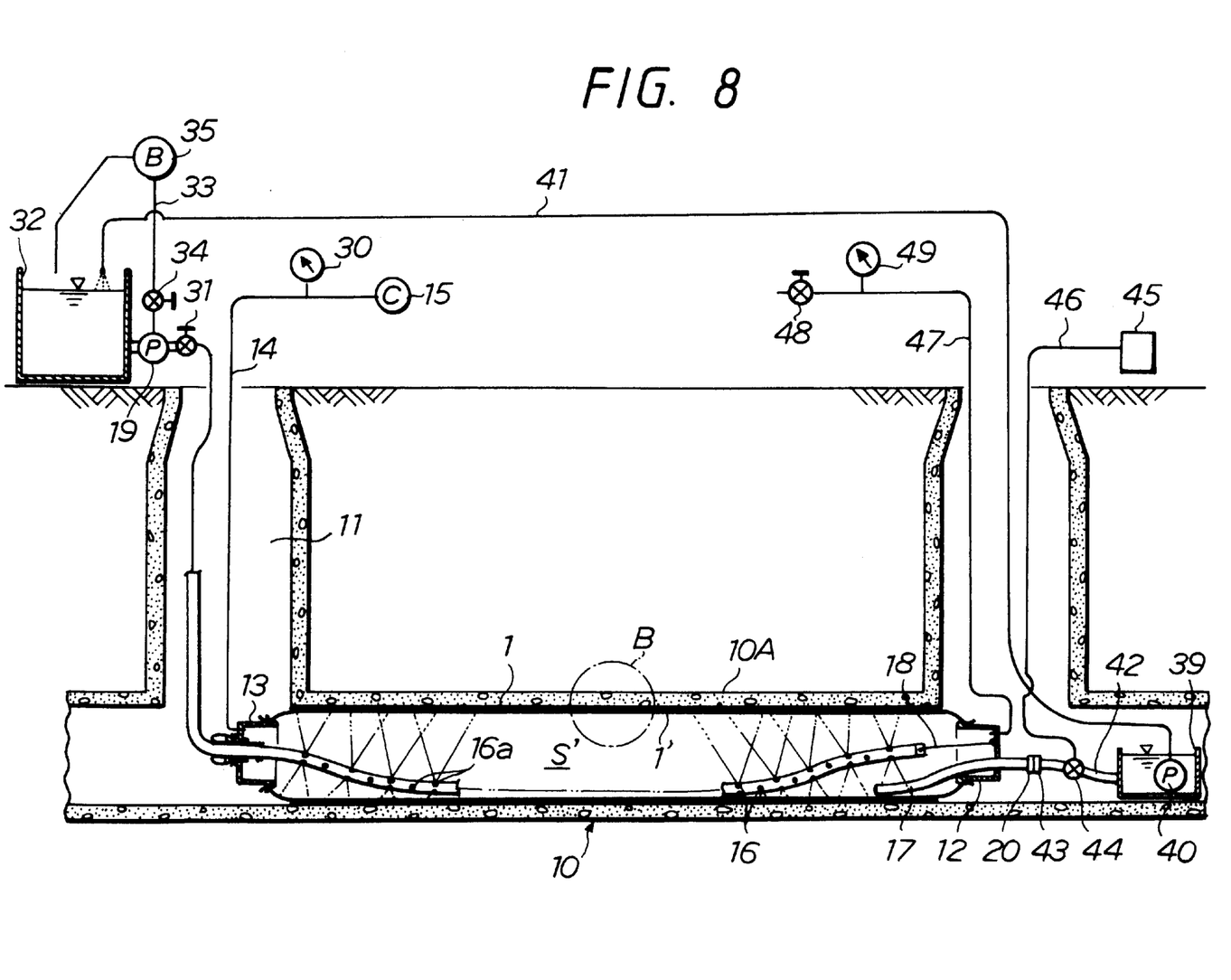
FIG. 8 is a sectional view of a repair operation site, illustrating still another step of the pipe lining method according to the invention.

When the lining operation on the portion 10A of the sewer pipe 10 is completed with the pipe liner 1 hardened, as described above, the valve 48 is opened so as to release the compressed air into the atmosphere from the closed space S of the pipe liner 1 by way of the air release hose 47. Then, those portions of the pipe liner 1 which are not lining the interior of the portion 10A are cut off, and all the elements but the pipe liner 1 are retrieved from the underground; now, the sewer pipe 10 is put back into service again; that is, the drain water is allowed to run in the sewer pipe 10 again. However, if a thicker lining is desired, another pipe liner 1' is prepared similarly as the liner 1, and is drawn into the sewer pipe 10 (or more precisely into the pipe liner 1), and the sewer pipe 10 is further lined, as the above-described procedure is repeated (ref. FIG. 7).

Specifically, while allowing the drain water to run in the pipe 10 as usual, the winch 25 is driven to pull the pipe liner 1' into the portion 10A of the sewer pipe 10 (or more precisely into the pipe liner 1) past the liner guide 22, as shown in FIG. 7.

When the entire length of the pipe liner 1' is drawn into the sewer pipe 10 (pipe liner 1), the flow of the drain water in the pipe 10 is temporarily checked again at a location upstream from the portion 10A of the pipe 10 (for instance, at a pumping location), and the compressor 15 installed on the ground is driven to supply compressed air to the closed space S of the pipe liner 1' by way of the air hose 14. Then, the pipe liner 1' is inflated with the compressed air and pressed against the inner wall of the portion 10A of the sewer pipe 10.

While the pipe liner 1' is inflated with the compressed air and kept being pressed against the inner wall of the portion 10A of the sewer pipe 10, as described earlier, the hot water pump 19 is driven to rush hot water into the hot water hose 16 from the hot water tank 32. The hot water is then sprinkled from the punctures 16a made throughout that portion of the hose 16 which is disposed inside the closed space S.

Thus, the pipe liner 1' is heated by the hot water sprinkled inside the closed space S in a manner such that the inner wall surface of the pipe liner 1' is first heated and gradually the heat is conducted radially outwardly through the thickness of the pipe liner 1'. The thermosetting resin impregnated through the thickness of the pipe liner 1' is thereby heated and hardened, and thus the interior of the portion 10A of the sewer pipe 10 is lined with the two liner layers consisting of the pipe liners 1, 1', as shown in FIG. 10, and the rehabilitation and reinforcement of the pipe 10 is done.

When the lining operation on the portion 10A of the sewer pipe 10 is completed with the pipe liner 1' hardened, as described above, the valve 48 is opened so as to release the compressed air into the atmosphere from the closed space S of the pipe liner 1' by way of the air release hose 47. Then, those portions of the pipe liner 1' which do not partake in lining the interior of the portion 10A are cut off and all the elements but the pipe liner 1' are retrieved from the underground; now, a series of lining operation is completed and the freshly lined sewer pipe 10 is put back into service again.

Now, as described above, in the pipe lining method according to the present invention, the pipe liners 1, 1' are inserted into the underground sewer pipe 10 as they are by towing rather than by the conventionally employed eversion method, in which the liners are turned inside out by fluid pressure, and this towing of the pipe liners 1, 1' into the sewer pipe 10 can be done while the sewer pipe 10 is in service (that is, the drain water is not stopped from flowing in the pipe 10), and thus it is possible to prepare for the hot water sprinkling at the same time as a pipe liner is set in the portion 10A of the sewer pipe 10. Thus, the sewer pipe 10 has to be temporarily kept out of service only while the pipe liners 1, 1' drawn into the sewer pipe 10 are inflated and pressed against the inner wall of the pipe 10 and hardened, by checking the flow of the drain water at a location upstream to the portion 10a of the pipe 10. Thus, the lining operation on the sewer pipe 10 can be conducted in a shorter time and more simply, and the time length over which the use of the sewer pipe 10 is suspended (or the time length over which the drain water is prevented from flowing in the sewer pipe 10) is significantly reduced, and for this reason, even if the sewer pipe 10 has a relatively large diameter it is possible to conduct the lining operation without stopping a large amount of the sewer for a long time.

Also, in the above-described embodiment of the present pipe lining method, the sequence of the steps of inserting a pipe liner into the sewer pipe 10 and hardening the pipe liner is arranged to be carried out twice, namely for the pipe liner 1 and the pipe liner 1', so that it is possible to select pipe liners which have relatively small thicknesses for the pipe liners 1 and 1'; consequently, the time required to harden the thermosetting resin can be reduced, and also by lining the inner wall of the sewer pipe 10 with more than one pipe liner layers, it becomes possible to provide a sufficiently thick liner to the sewer pipe 10 of a large diameter. Incidentally, in order to facilitate quick hardening of the thermosetting resin impregnated through the thickness of a pipe liner, the thickness of the pipe liner must not be greater than 15 mm. Therefore, in a case where 40 mm-thick lining is required, two 15 mm-thick pipe liners and one 10 mm-thick pipe liner, for example, may be used; thus, sequence of the steps of inserting a pipe liner into the sewer pipe 10 and hardening the pipe liner is repeated three times for these three pipe liners.

As described above, in this embodiment of the invention, while the sequence of the steps of drawing a pipe liner into the sewer pipe 10 and hardening the pipe liner is repeated for the two pipe liners 1, 1', the hot water is circulated so that it can be used over and over again for the heating of the pipe liners; consequently, it is possible to downsize the heating facility consisting of the hot water tank 32, the boiler 35, etc., and thus the lining operation becomes more economical and less energy-consuming.

Incidentally, in this embodiment, the inventive method is applied to an underground sewer pipe; however, it is of course possible to apply the same method to any pipeline.

While the invention has been described in its preferred embodiments, it is to be understood that modifications will occur to those skilled in the art without departing from the spirit of the invention. The scope of the invention is therefore to be determined solely by the appended claims.

What is claimed is:

1. A method for lining a tubular conduit comprising:
   (a) preparing a tubular liner assembly having a front end and a rear end capable of being closed, and consisting essentially of: a fabric layer which is soaked with a thermosetting resin and which has a tubular shape; and two layers of airtight film with which inner and outer walls of the fabric layer are respectively covered;
   (b) closing the front end and the rear end of the tubular liner assembly with sealing means for sealing the ends before inserting the tubular liner assembly into the tubular conduit;
   (c) supplying gas conduit means through the sealing means before inserting the tubular liner assembly into the tubular conduit, the gas conduit means for supplying gas to the interior of the closed tubular liner assembly;
   (d) supplying first liquid conduit means through the sealing means and substantially throughout a length of the closed tubular liner assembly before inserting the tubular liner assembly into the tubular conduit, the first liquid conduit means for sprinkling hot liquid uniformly inside the tubular liner assembly;
   (e) inserting the liner assembly into the tubular conduit from the front end by pulling the front end with a pulling means while allowing fluid to flow in the tubular conduit;
   (f) pneumatically inflating the tubular liner assembly against an interior of the tubular conduit with compressed air using the gas conduit means, the compressed air being supplied to the interior of the tubular liner assembly after closing the front and the rear ends;
   (g) heating the thermosetting resin by the sprinkling hot liquid uniformly inside the tubular liner assembly from the first liquid conduit means to thereby harden the fabric layer of the liner assembly;
   (h) removing those portions of the tubular liner assembly which do not partake in lining the tubular conduit to open said tubular lining assembly to the flow in the conduit subsequent to step (g);
   (i) providing a guide nozzle over the tubular conduit prior to inserting the liner assembly into the tubular conduit;
   (j) inserting a tubular liner guide over the guide nozzle and into the tubular conduit prior to inserting the liner assembly into the tubular conduit;
   (k) passing the pulling means through the guide nozzle, the tubular liner guide and the tubular conduit, wherein the pulling means is a tow rope; and
   (l) inserting the liner assembly into the tubular conduit from the front end by pulling the front end with the tow rope.

2. The method as recited in claim 1, wherein said tubular liner assembly further consists essentially of a second liquid conduit means for drawing liquid from the interior of the closed tubular liner assembly; and the liquid used to heat the thermosetting resin is drawn out from the interior of the closed tubular liner assembly by way of the second liquid conduit means and after being heated sprinkled from said first liquid conduit means again.

3. The method as recited in claim 1, wherein the first liquid conduit means is a water hose.

4. The method as recited in claim 1, wherein the first liquid conduit means has a plurality of punctures distributed evenly throughout a portion of the first liquid conduit means disposed within the closed tubular liner assembly.

5. The method as recited in claim 1, wherein the sealing means are sealing caps.

6. The method as recited in claim 1, wherein the first liquid conduit means is tethered to an inner face of the sealing means by a rope.

7. The method as recited in claim 1, further comprising inserting a drain hose in the closed tubular liner assembly.

8. The method as recited in claim 1, wherein the heating the thermosetting resin comprises sprinkling hot liquid uniformly inside the tubular liner assembly after the closed tubular liner assembly is inflated.

9. The method as recited in claim 8, further comprising a drain hose that drains the hot liquid from the closed tubular liner assembly after the hot liquid is sprinkled into the closed tubular liner assembly.

10. The method as recited in claim 1, wherein the first liquid conduit means is sealed to the sealing means by air-tight tubing.

11. The method as recited in claim 10, wherein the first liquid conduit means is disposed within the liner assembly and is freely slidable through the sealing means.

12. The method as recited in claim 1, further comprising releasing the compressed air from the tubular liner assembly after the tubular liner assembly has hardened.

13. A method for lining a tubular conduit comprising:
   (a) preparing a tubular liner assembly having a front end and a rear end capable of being closed, and consisting essentially of: a fabric layer which is soaked with a thermosetting resin and which has a tubular shape; and two layers of airtight film with which inner and outer walls of the fabric layer are respectively covered;
   (b) closing the ends of the tubular liner assembly;
   (c) providing a guide nozzle over the tubular conduit prior to inserting the liner assembly into the tubular conduit;
   (d) inserting a tubular liner guide over the guide nozzle and into the tubular conduit prior to inserting the liner assembly into the tubular conduit;
   (e) passing a pulling means through the guide nozzle and the tubular liner guide, and inserting the liner assembly into the tubular conduit from the front end by pulling the front end with the pulling means after the ends of the tubular liner assembly are closed, the pulling means being a tow rope;

(f) pneumatically inflating the tubular liner assembly against an interior of the tubular conduit after closing the front and the rear ends;

(g) heating the thermosetting resin to thereby harden the fabric layer of the liner assembly;

(h) removing those portions of the tubular liner assembly which do not partake in lining the tubular conduit to open the tubular lining assembly to the flow in the conduit subsequent to step (g); and repeating the above steps (a), (b) and (e) through (h) in a same location as the hardened tubular liner assembly.

14. The method as recited in claim 13, where said tubular liner assembly consists essentially of: (i) a pair of sealing means with which the ends of said tubular layer are closed before the insertion of the liner assembly into the tubular conduit, (ii) a gas conduit means for supplying gas to the interior of the closed tubular liner assembly, and (iii) a first liquid conduit means which is inserted in the tubular liner assembly substantially throughout the length thereof and adapted to sprinkle hot liquid uniformly inside the tubular liner assembly; and in said step (f) the inflation is effected with compressed air supplied to the interior of the closed tubular liner assembly by way of the gas conduit means, and in said step (g) the heating is effected by sprinkling hot liquid from said first liquid conduit means.

15. The method as recited in claims 14, wherein said tubular liner assembly further consists essentially of a second liquid conduit means for drawing liquid from the interior of the closed tubular liner assembly; and the hot liquid used to heat the thermosetting resin is drawn out from the interior of the closed tubular liner assembly by way of the second liquid conduit means and after being heated sprinkled from said first liquid conduit means again.

* * * * *